Patented Jan. 26, 1954

2,667,491

UNITED STATES PATENT OFFICE

2,667,491

PYRIDYLETHYL ETHERS AND PROCESS OF MAKING THEM

Leslie Hunt Sutherland, Springdale, Conn., and Francis E. Cislak, Indianapolis, Ind., assignors to Reilly Tar & Chemical Corporation, Indianapolis, Ind., a corporation of Indiana No Drawing. Application June 2, 1950, Serial No. 165,866

2 Claims. (Cl. 260—297)

This invention relates to a new class of chemical compounds and to the process of making them. More particularly it relates to the class of compounds formed by reacting a vinylpyridine with an alcohol, which compounds may be represented by the following general formula:

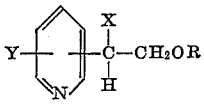

in which R represents an alkyl, a substituted alkyl, a cycloalkyl, or an alkaryl radical; X represents hydrogen, an alkyl, a substituted alkyl, a cycloalkyl, an alkaryl, or an aryl radical; Y represents hydrogen, an alkyl, a substituted alkyl, a cycloalkyl, an alkaryl, or an aryl radical.

The compounds of this invention are pyridylethyl ethers whose molecular structure includes the grouping

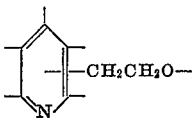

In general, the compounds of this invention may be prepared by reacting a vinylpyridine, or a compound which upon dehydration is converted into a vinylpyridine, with an alcohol in the presence of a catalyst. The reaction is carried out by heating the vinylpyridine and an alcohol at an elevated temperature. A solvent, such for example as toluene, may be used in carrying out the reaction although in general it is preferred not to use any solvent.

The German chemist Ladenburg reported in 1887 (Ber. 20, 1644) an experiment in which he dissolved 2-vinylpyridine in alcohol and then added to the solution a large excess of metallic sodium. The sodium reacted with the alcohol to liberate hydrogen and the nascent hydrogen reacted with the 2-vinylpyridine, reducing it to 2-ethylpiperidine, which reaction may be represented by the equation:

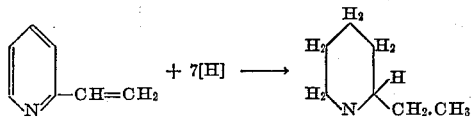

The process of our invention is not the process of Ladenburg. In our process the vinylpyridine reacts with the alcohol under non-hydrogenating conditions to give pyridylethyl ethers. The reaction of our process may be illustrated by the equation:

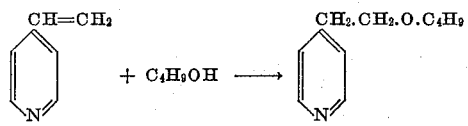

The invention will be described more fully in conjunction with the following specific examples of forming the new compounds therein set forth. The parts are by weight.

EXAMPLE I

*Butyl 4-pyridylethyl ether*

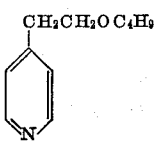

To a solution of 41 parts of 4-vinylpyridine in 202 parts of n-butanol is added 5 parts of sodium methoxide as a catalyst. This mixture is heated under reflux conditions for about 10 to 20 hours. After the refluxing, the mixture is cooled and the sodium methoxide catalyst is neutralized by the addition of the appropriate quantity of a mineral acid. The butyl 4-pyridylethyl ether, which boils at about 120° C. at 3 mm. mercury pressure, formed during the refluxing period is separated from the reaction mixture in any suitable manner, as by vacuum distillation.

EXAMPLE II

*Butyl 2-pyridylethyl ether*

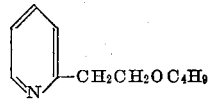

A. Butyl 2-pyridylethyl ether may be prepared as follows: To 22 parts of n-butanol (containing about 5% water) are added 1 part of sodium hydroxide and 7 parts of 2-ethanolpyridine (the 2-ethanolpyridine is a compound which upon dehydration is converted into 2-vinylpyridine). The resulting mixture is heated under refluxing conditions for about 6 to 10 hours. After the refluxing, the reaction mixture is cooled and the butyl 2-pyridylethyl ether formed is separated from the reaction mixture in any suitable manner, such as extracting the reaction mixture with successive portions of water, discarding the water wash, and subjecting the water insoluble residue to vacuum distillation to separate the butyl 2-pyridylethyl ether therefrom.

B. Butyl 2-pyridylethyl ether may also be prepared in the following manner: To 8 parts of n-butanol are added 4 parts of 2-vinylpyridine and 1 part of concentrated sulfuric acid. The resulting mixture is heated under refluxing conditions for about 16 hours. After the refluxing the reaction mixture is cooled and it is neutralized by the addition of a caustic soda solution. The neutral reaction mixture is washed with two successive portions, of 25 parts, of water. The butyl 2-pyridylethyl ether, formed during the refluxing period, remains in the water insoluble portion and is isolated therefrom by vacuum distillation.

EXAMPLE III

*n-Hexyl 3'-hydroxy-2'-(2-pyridyl)-propyl ether*

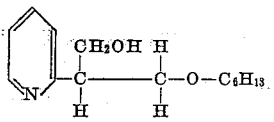

To 157 parts of n-hexanol is added 57 parts of 2'-(2-pyridyl)allyl alcohol and 4 parts of sodium hexoxide $NaOC_6H_{13}$. The resulting mixture is refluxed for about 5 to 10 hours. After the refluxing, the reaction mixture is cooled and the n-hexyl 3'-hydroxy-2'-(2-pyridyl)-propyl ether, which boils at about 180° C. at 18 mm. mercury pressure, is separated from the reaction mixture in any suitable manner. One suitable manner of separating the n-hexyl 3'-hydroxy-2'-(2-pyridyl)-propyl ether from the reaction mixture is by washing the latter with water, using two successive 100 parts portions, discarding the water wash and subjecting the water insoluble portion to vacuum distillation.

EXAMPLE IV

*Hydroxyethyl 2-pyridylethyl ether*

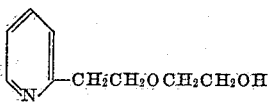

To a solution of 124 parts of ethylene glycol and 104 parts of 2-vinylpyridine (containing 1 part of benzoquinone) are added 8 parts of sodium methoxide and 400 parts of pyridine. This mixture is then heated under refluxing conditions for about 40 to 48 hours. After the refluxing, the mixture is cooled and filtered to remove a small amount of solid material suspended therein. The hydroxyethyl 2-pyridylethyl ether formed is recovered from the filtrate by vacuum distillation. The hydroxyethyl 2-pyridylethyl ether boils at about 120° C. at 5 mm. Hg. pressure.

EXAMPLE V

*Tetrahydrofurfuryl 3' - hydroxy-2'-(2-pyridyl) propyl ether*

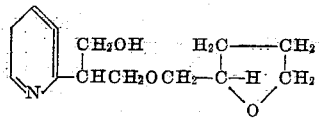

To a solution of 23 parts of 2'-(2-pyridyl)allyl alcohol in 53 parts of tetrahydrofurfuryl alcohol is added one part of potassium hydroxide. The mixture is then heated at about 150°–160° C. for about 15 to 20 hours. The reaction mixture is then cooled to room temperature and one part of concentrated sulfuric acid is added. The tetrahydrofurfuryl 3' - hydroxy-2'-(2 - pyridyl)- propyl ether formed during the heating period is separated from the reaction mixture by vacuum distillation; this ether boils at about 155° C. at 4 mm. Hg. pressure.

EXAMPLE VI

*2-methoxyethyl-5-ethylpyridine*

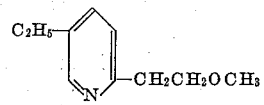

To a solution of 7 parts of 2-vinyl-5-ethylpyridine in 20 parts of methanol is added 1 part of potassium hydroxide. The resulting mixture is placed in a pressure vessel and heated, under pressure with constant agitation, at 150° C. for about 6 to 10 hours. After the heating period the reaction mixture is cooled and the 2-methoxyethyl - 5 - ethylpyridine formed is separated from the reaction mixture in any suitable manner. We have found one such suitable manner to be as follows: Subject the reaction mixture to distillation at atmospheric pressure, stopping the distillation when most of the unreacted methanol has distilled over; wash the residue from the distillation with two successive portions of water, of about 20 parts each, discard the water layer; subject the water insoluble portion to vacuum distillation to recover the 2-methoxyethyl-5-ethylpyridine, which boils at about 100° C. at 10 mm. mercury pressure.

EXAMPLE VII

*Ethyl 2-pyridylethyl ether*

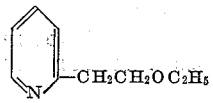

To a solution of 9 parts of 2-vinylpyridine in 25 parts of ethyl alcohol is added 1 part of potassium hydroxide. The resulting mixture is placed in a pressure vessel and heated, under pressure, at 150° C. for about 5 to 8 hours. After the heating the reaction mixture is cooled, the potassium hydroxide catalyst is neutralized with hydrochloric acid, and the ethyl 2-pyridylethyl ether formed during the heating period is separated by vacuum distillation. The ethyl 2-pyridylethyl ether boils at about 100° C. at 20 mm. mercury pressure.

EXAMPLE VIII

*n-Decyl 2-pyridylethyl ether*

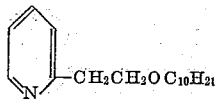

To a solution of 10 parts of 2-vinylpyridine in 47 parts of n-decanol is added 1 part of potassium hydroxide. The resulting mixture is then heated at reflux temperature (140°–150° C.) for about 18 hours. After the refluxing, the reaction mixture is cooled to room temperature and then extracted with water, discarding the water wash. The water insoluble residue is subjected to vacuum distillation to separate the n-decyl 2-pyridylethyl ether therefrom. The n-decyl 2-pyridylethyl ether thus recovered boils at 182°–192° C. at 12 mm./Hg, and has a refractive index (D line of sodium) at 20° C. of 1.4772.

EXAMPLE IX n-Decyl 4-pyridylethyl ether

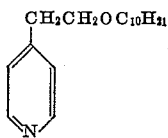

The procedure of Example VIII is repeated except that 4-vinylpyridine is used in place of the 2-vinylpyridine. The n-decyl 4-pyridylethyl ether thus obtained boils at about 200° C. at 9 mm./Hg and has a refractive index (D line of sodium) at 20° C. of 1.4804-5.

In place of the catalysts employed in the foregoing examples other catalysts may be used. Any of the alkali metal hydroxides or alkali metal alkoxide or quaternary ammonium hydroxides may be employed; and any mineral acid may be used.

The vinylpyridines have a tendency to polymerize. It is therefore desirable to carry out the reaction of this invention at as low a temperature as is possible. It is also desirable to provide agitation to prevent local overheating. When employing an alcohol of high boiling point, it is found advantageous to use a solvent having a lower boiling point; by the use of such lower boiling solvent the temperature of refluxing may be conveniently controlled.

Because of the tendency of the vinylpyridines to polymerize they normally contain an inhibitor, such as benzoquinone, to prevent polymerization during storage. The inhibitor may be removed before reacting the vinyl-pyridine with the alcohol, but this, however, is not necessary as the reaction of the vinylpyridine with the alcohol proceeds with the inhibitor being present.

Some of the compounds of our invention possess remarkable insecticidal properties. For example, the toxicity of three of our compounds against the Mexican bean beetle is tabulated below:

|  | Dilution, Percent | Percent Kill, 72 Hours |
|---|---|---|
| n-butyl 2-pyridylethyl ether | 0.1<br>1.0 | 0<br>0 |
| n-butyl 4-pyridylethyl ether | 0.1<br>1.0 | 0<br>100 |
| n-decyl 4-pyridylethyl ether | 0.1<br>1.0 | 70<br>100 |

The above data show that the same substituent in the 4-position of the pyridine nucleus is much more effective than in the 2-position. Also, an n-decyl 4-pyridylethyl ether is many times more effective than is an n-butyl 4-pyridylethyl ether.

Some of our compounds are efficient inhibitors for use in the pickling of metals with acids. For example, n-decyl 4-pyridylethyl ether is a remarkably effective inhibitor. The inhibiting power of n-decyl 4-pyridylethyl ether was determined by the procedure described below:

To 1500 cc. of aqueous 6% sulfuric acid maintained at 82° C. is added 0.5 gram of the composition being tested. Three sheets of 30 gauge cold rolled steel (3" x 4") which had previously been descaled, are immersed in the inhibited acid bath for 40 minutes. The weight lost by the sheets during the immersion in the inhibited bath is recorded. A control test is made by immersing three similar steel sheets for 40 minutes in 1500 cc. of aqueous 6% sulfuric acid maintained at 82° C. to which no inhibitor has been added; the weight lost by the control sheets during the immersion period is recorded. The inhibiting power, in per cent, is calculated by dividing the difference in the weight lost by the control sheets and by the inhibited sheets by the weight lost by the control sheets and multiplying by 100. As so determined, the inhibiting power of n-decyl 4-pyridylethyl ether is 96%.

It is obvious that the above description and examples set forth are intended to be illustrative only and that they may be varied or modified to a considerable extent without departing from the spirit of the invention or sacrificing the advantages thereof, and therefore it is not intended that this invention be limited to the specific embodiments herein set forth except as may be required by the appended claims.

This application is a continuation-in-part of our co-pending application Serial Number 642,128 filed January 18, 1946, now abandoned.

We claim as our invention:
1. The process of making pyridylethyl ethers which comprises heating under reflux conditions a mixture of an alcohol and a compound of the class consisting of a 2-vinylpyridine and 4-vinylpyridine and recovering the resultant pyridylethyl ether.

2. n-Decyl 4-pyridylethyl ether whose structural formula is:

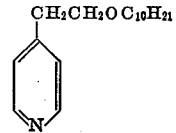

LESLIE HUNT SUTHERLAND.
FRANCIS E. CISLAK.

References Cited in the file of this patent

UNITED STATES PATENTS

| Number | Name | Date |
|---|---|---|
| 2,504,098 | Morris | Apr. 18, 1950 |

OTHER REFERENCES

Tracy, J. Organic Chemistry, vol. 6 (1941), pp. 54-62.

Beilstein, vol. 20, page 256, 4th ed. (1935).

Chemical Abstracts, vol. 32 (1938), page 4985.